United States Patent
Hoogenakker et al.

(10) Patent No.: US 7,741,960 B1
(45) Date of Patent: Jun. 22, 2010

(54) VEHICLE COMMUNICATION METHOD AND APPARATUS

(75) Inventors: Alan Hoogenakker, Urbandale, IA (US); Donald Pieronek, Brookfield, WI (US)

(73) Assignee: Active Technology II, LLC, Ft. Worth, TX (US)

( * ) Notice: Subject to any disclaimer, the term of this patent is extended or adjusted under 35 U.S.C. 154(b) by 288 days.

(21) Appl. No.: 12/079,357

(22) Filed: Mar. 26, 2008

(51) Int. Cl.
G08B 21/00 (2006.01)
H04M 11/04 (2006.01)
G05B 1/00 (2006.01)

(52) U.S. Cl. .................. 340/431; 340/538; 340/538.11; 340/538.15; 340/310.12; 701/36

(58) Field of Classification Search .................. 340/431, 340/538.11
See application file for complete search history.

(56) References Cited

U.S. PATENT DOCUMENTS

| | | | |
|---|---|---|---|
| 4,677,308 A | 6/1987 | Wroblewski | |
| 5,412,644 A | 5/1995 | Herberle | |
| 5,739,592 A | 4/1998 | Rigsby | |
| 6,188,314 B1* | 2/2001 | Wallace et al. | 340/438 |
| 6,256,557 B1* | 7/2001 | Avila et al. | 701/1 |
| 6,756,881 B2* | 6/2004 | Bateman et al. | 370/212 |
| 7,059,689 B2 | 6/2006 | Lesesky | |

OTHER PUBLICATIONS

Asynchronous Serial Transmission, www-scm.tees.ac.uk/users/u0000408/Async/async.htm, Sep. 21, 1999.
RS-232, en.wikipedia.org/wiki/RS-232, last updated Feb. 20, 2008.

* cited by examiner

*Primary Examiner*—Donnie L Crosland
(74) *Attorney, Agent, or Firm*—G. Brian Pingel; Camille L. Urban

(57) ABSTRACT

An apparatus and method for binary communication between a vehicle and a trailer transmits high voltage and low voltage signals detectable as high bits and low bits aggregated into messages. A controller in the vehicle and trailer subsystems each include transceivers for transmitting messages across the vehicle's powerbus that are detectable when current flows across the powerbus. The apparatus and method are useful for controlling trailer brakes via a blue wire interface.

32 Claims, 6 Drawing Sheets

VEHICLE COMMUNICATION METHOD AND APPARATUS

FIELD OF INVENTION

This invention relates generally to data communication between vehicles and trailers, more specifically to methods of binary communication using existing vehicle wiring.

BACKGROUND OF INVENTION

It is well known in the art to connect trailer lighting and trailer braking systems to towing vehicles via standardized connectors. The connector pins of current connectors have predefined signal assignments for vehicle and trailer subsystems including brakes lights, running lights, battery, ground, and trailer brakes. The trailer brake connector is commonly a blue wire and thus referred to herein as the "Blue Wire" or "Blue Wire Interface". These signal wires, including the Blue Wire, are subject to shifts in ground levels between the trailer and the towing vehicle.

Under normal driving conditions the ground level of the Blue Wire is nearly constant. However, under certain conditions, these prior known systems cause voltage drops across the ground and power wires. When the Blue Wire provides power to trailer subsystems as trailer brakes, voltage drops result from braking events. The extent of a voltage drop depends upon such factors as the amount of electrical current needed for braking, the distance between a brake controller and trailer brakes, and the wire gauge. These voltage drops result in reduced braking force, even if the system may appear to function properly.

SUMMARY

The purpose of the present invention is to provide methods and apparatus for binary communication between a vehicle and a trailer using existing vehicle wiring serving as a powerbus. The methods and apparatus must be reliable despite voltage drops along the powerbus connecting the vehicle and the trailer. A controller in the vehicle and a subsystem of the trailer are outfitted with transceivers that generate voltage or pull negative voltage. Messages sent across the powerbus are the result of a series of high and low voltages over time. Voltage swings are detected above and below voltage thresholds despite shifting ground levels.

The message may include a start bit, stop bit, and a parity bit, each either represented by high or low voltage swings. When the message is at an end of frame, the transmitter is disabled, returning the powerbus voltage to ground level.

The methods and apparatus herein described are specifically useful with trailer braking systems such as that of U.S. patent application Ser. No. 10/861,498, which application is hereby incorporated by reference in its entirety. However, the methods and apparatus are advantageous for communication between a vehicle and an unlimited variety of towed vehicles and towed vehicle subsystems.

It is therefore an object of the present invention to provide reliable binary communication between a vehicle and a trailer despite shifting ground levels.

It is further an object of the present invention to provide binary communication between a vehicle and trailer braking systems during braking events.

It is also an object of the present invention to provide a means of binary communication for transmitting data from a trailer over an existing vehicle network.

It is additionally an object of the present invention to provide binary communication across existing vehicle wiring such as the Blue Wire Interface.

Other objects, features, and advantages of the present invention will be readily appreciated from the following description. The description makes reference to the accompanying drawings, which are provided for illustration of the preferred embodiment and method. However, such embodiment and method do not represent the full scope of the invention. The subject matter which the inventor does regard as his invention is particularly pointed out and distinctly claimed in the claims at the conclusion of this specification.

DETAILED DESCRIPTION OF PREFERRED EMBODIMENTS

Binary communication using high voltages and low voltages over a period of time has been found to be advantageous to improve the integrity of vehicle to trailer communication. "Electrical noise" is a common problem that interferes with communication along wiring between vehicles and trailers. Electrical noise may be caused by a number of factors, including capacitance, resistance, and inductance of the communications media, i.e. wires, electrical transients coupled into the communications media, and voltage transients within devices connected to vehicle wiring. Due to "electrical noise", a message may be received in a different form than when it was sent. This difference is the result of changes in voltage and the voltage thresholds at which a device receiving a message interprets the message bits.

Threshold levels of high and low voltages are determined by comparing the signal voltage level to a common ground voltage reference signal. For example, a binary one may be defined as voltage exceeding a high threshold and a binary zero may be defined as voltage below a low voltage threshold. This approach has been found to work only when the relative ground reference does not vary significantly from the actual ground level at any given time. To accommodate varying ground levels, as observed in vehicle to trailer communication, the technique of differential signal levels was employed. By comparing the difference in voltages between two communications wires, high and low voltages are determined by the amount of voltage one wire exceeds the other. A ground shift in either the positive or negative direction has a lesser effect on detection of voltage so long as the voltages are within a high or a low detectable voltage thresholds, respectively, and there is sufficient difference in voltages between the two signal wires.

Figure 1:
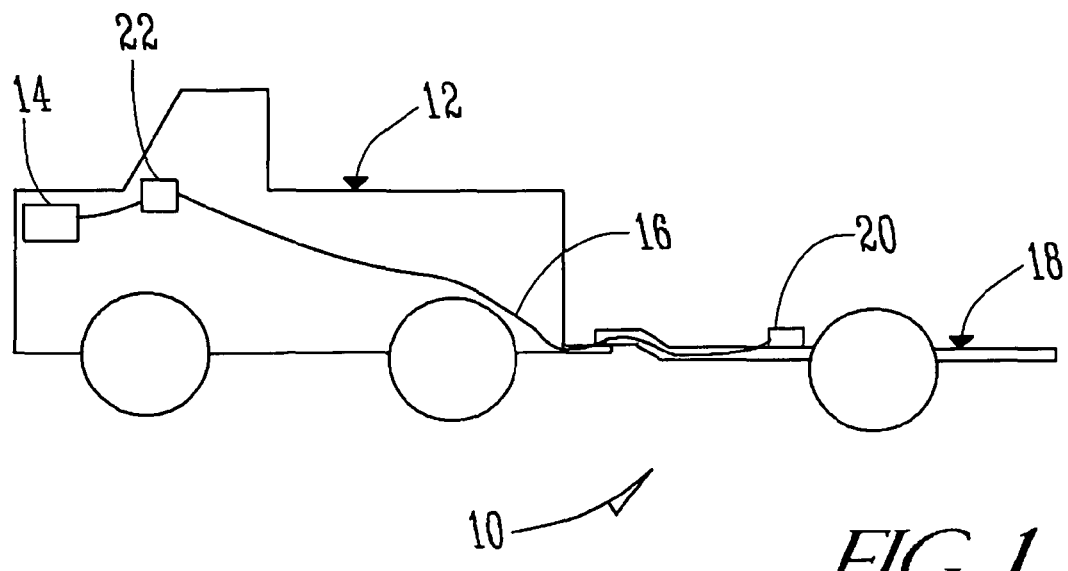
FIG. 1 is a block diagram of the preferred embodiment of an apparatus of the present invention.

FIG. 1 illustrates an apparatus 10 of the preferred embodiment of the present invention. A towing vehicle 12 has a battery 14 and a power bus 16 connected to the battery 14. The towing vehicle 12 pulls a towed vehicle 18, which may be referred to as a trailer. The towed vehicle 18 includes subsystems 20 that are electrically connected to the power bus 16 and draw power from the battery 14 of the towing vehicle 12. For simplicity, FIG. 1 shows the power bus 16 extending to the subsystems 20 in towed vehicle 18. In actual practice, the towed vehicle 12 will likely have standard connectors for electrically connecting the powerbus 16 to the towed vehicle 18. A controller 22 is ordinarily added to the vehicle 12 as an after-market part but in any case the controller 22 is electrically connected to the power bus 16.

Figure 2:
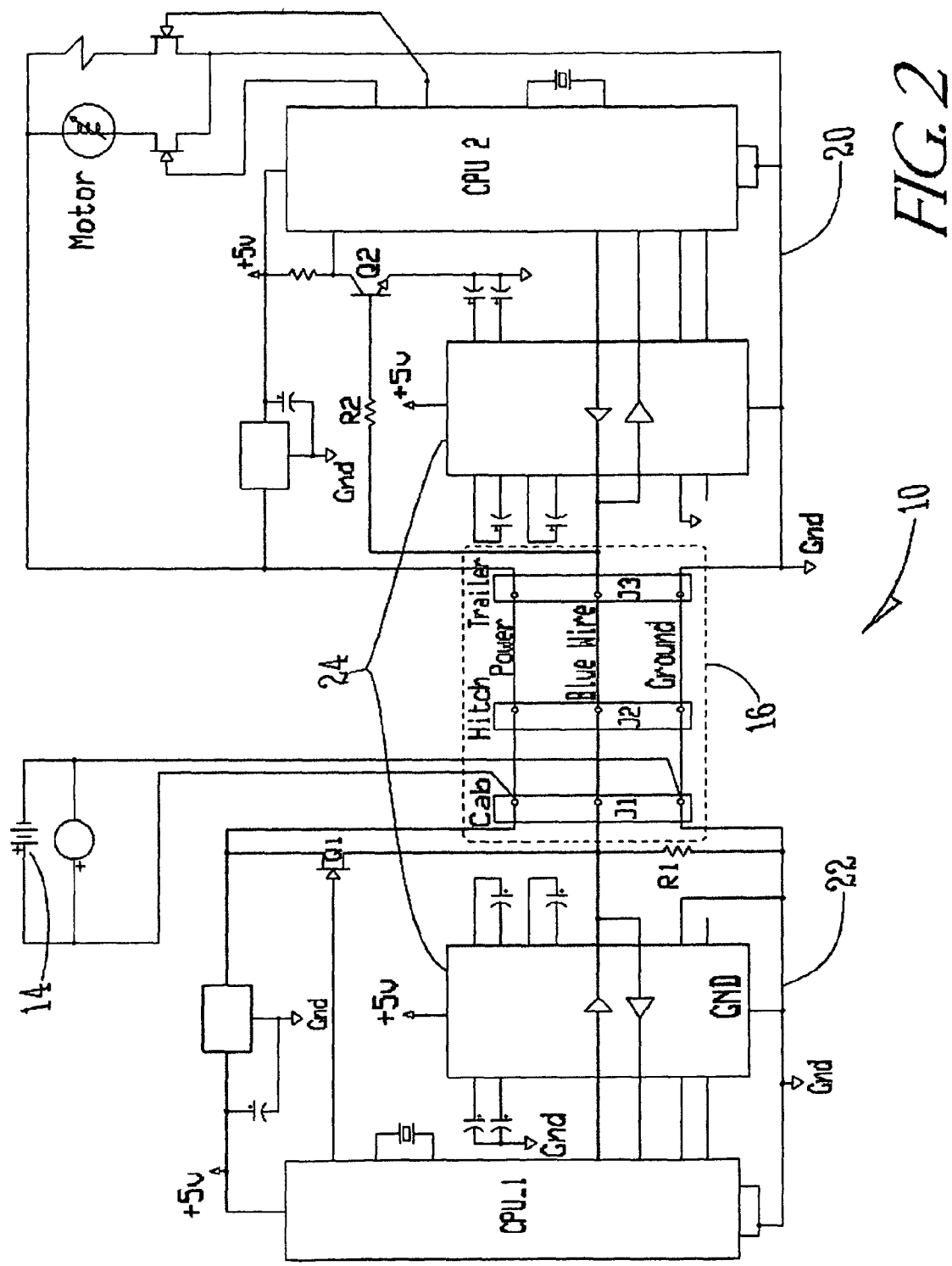
FIG. 2 is an electronic schematic diagram of the apparatus of FIG. 1.

As shown in FIG. 2, the controller 22 and the subsystems 20 each incorporate an electronic circuit 24 that enables communication across the power bus 16. In the preferred embodiment, the electronic circuits 24 are transceivers, such as a universal asynchronous receiver transmitter, for transmitting and receiving binary messages. An RS232 type transceiver is preferred due to its low cost even though higher quality transceivers may be available. In the preferred embodiment, the controller 22 and the subsystem 20 each include a microprocessor CPU1 and CPU2, respectively. The microprocessors CPU1 and CPU2 each have a uniform synchronous asynchronous receiver transmitter ("USART").

To operate under shifting ground level conditions the voltage levels for high and low bits must be within acceptable voltage ranges during current draw and when no or little current is drawn across the power bus 16. To overcome the obstacles to communicating across a blue wire with shifting voltages, the electronic circuits 24 must be adapted so that they create and detect voltage swings over the power bus 16 that compensates for shifts in the ground level voltage at any given time. To allow detection of low voltages representing the low bit, the electronic circuit 24 must have the ability to generate negative voltages relative to ground level. RS-232 transceivers are further preferable because they have integral negative voltage power generation capabilities.

The preferred apparatus 10 is particularly useful for trailer braking. In the preferred embodiment, therefore, one of the subsystems 20 is a trailer brake actuator and the controller 22 is a trailer brake controller. The power bus 16 is preferably an existing Blue Wire Interface standard in contemporary vehicles. The power bus 16 of the preferred embodiment thus includes a ground and a signal wire. For trailer braking, the power bus 16 also provides the current to power the subsystems 20.

To illustrate the problem of shifting voltages, assume that during normal operation of the towing vehicle 12, the voltage at vehicle battery 14 is 13.5VDC relative to its ground level. When there is not a braking event, a very low current flows to the subsystems 20 and the voltage measured at the subsystems 20 relative to the vehicle battery ground will also be 13.5VDC. During a braking event, the battery 14 provides power through the power bus 16 to the subsystems 20, for powering such subsystems as an electric trailer brakes and electrically controlled hydraulic brakes. The inrush current to the subsystems 20 and the current returning to the battery ground can initially peak at around 60 amperes and remain in the range of 20 amperes at high brake pressures.

When these large currents are drawn, voltage along the powerbus 16 drops according to ohms law: voltage (V) equals current (I) times resistance (R) or V=I×R. The resistance of the powerbus 16 is dependent upon several factors, including wire gauge, distance, connectors between the vehicle 12 and the towed vehicle 18, the resistance of the electronic circuits 24, and the extent of corrosion. Assuming resistance is fixed, increasing current flowing decreases voltage. In the example of heavy braking conditions, the voltage of the battery 14 relative to its ground level will generally be 13.5VDC but the voltage of the subsystems 20 relative to battery ground may be 10VDC. The ground reference voltage at the subsystems 20 may thus be 3.5VDC due to the voltage drop across the powerbus 16. At current levels required for trailer braking, a 3.5VDC drop occurs across power wire and ground wire of the powerbus 16 during a braking event.

Specific to the apparatus 10 where the subsystems 20 includes a trailer braking actuator, existing brake wiring connectors J1, J2 and J3, identified as in FIG. 2, are each a pair of mated connectors for connecting to the towing vehicle 12. The connector J1 connects the controller 20 to the vehicle. The connector J2 connects the towing vehicle to the subsystems 20. The wiring from the connector J1 to the connector J2 is often included in a "trailer towing package" sold with vehicles. The connector J3 connects subsystems 20 in the towed vehicle 18. The wiring from the connector J2 to the connector J3 is provided by the towed vehicle 18. These connectors J1, J2, and J3 use standard pins, requiring no adaptations to the connectors J1, J2, and J3 by the preferred apparatus 10. The wire gauges used and the quality of the connectors J1, J2, and J3 determines the extent of voltage drops incurred when trailer brakes engage. Voltage drops may be diminished by running additional power wires from the vehicle 12 to the subsystems 20, but it is desirable to utilize existing vehicle equipment.

The preferred method of the present invention is communication of binary messages formed of high and low voltages over intervals of time. All of the examples of the method utilize apparatus 10, but as explained, there are unlimited variations of the apparatus 10 able to perform the preferred method. Binary messages are formed from series of high and low bits. The high bit and the low bit are equivalent to a binary one or zero, although which bit is a one or a zero is not critical to performing the preferred method and either bit could represent a one or a zero. High voltages generated across the powerbus 16 create the high bit and low voltages pulled across the powerbus 16 create the low bit. To convey a bit of data on a serial network, the high voltage must be greater than a high voltage threshold and the low voltage must be lower than a low voltage threshold and be maintained over an interval of time, or character time. The high bits and low bits may optionally be received as start, stop, and parity bits, depending upon the order of bits sent.

To perform the preferred method, the powerbus 16 as shown in FIG. 2 transmits a message from the controller 22 to the subsystem 20. The subsystem 20 compares the voltage of the powerbus 16 to ground level over an interval of time to determine the presence of a high bit or a low bit. To verify the message has been received properly, the subsystem 20 transmits a responsive message. Communications have been successful utilizing solely the available battery voltages and ground levels within the controller 22 and the subsystem 20.

Again using the example of sending a message from the controller 22 to the subsystem 20, at a specific point in time, or "sample point", the subsystem 20 compares the voltage to its high voltage threshold and low voltage threshold. The voltage level at the sample point determines whether the voltage is detectable as a bit, and if so, whether the bit is a high bit or a low bit. A voltage drop and ground shift will affect the thresholds and the voltage level at the subsystem 20. It is therefore accurate to describe determination of a high bit or a low bit as comparing the voltage of the powerbus 16 to the threshold levels relative to the local voltage and ground level at the sample point.

Detection of the high bit requires generating voltage levels along the powerbus 16 in excess of the high threshold. Detection of the low bit requires pulling a low or negative voltage along the powerbus 16 less than the detectable low threshold. The high threshold and the low threshold may be set at any voltage levels distinguishable by the electronic circuit 24.

As an example of bit detection with the preferred apparatus 10, the high threshold is set at 2V and the low threshold is set at 1V. Any voltage greater than 2VDC over character time would be detected as the high bit. Any voltage less than 1VDC or any negative voltage over character time would be detected as a low bit. These threshold are far enough apart for the RS232 transceivers to distinguish between the high voltage and the low voltage. The 2V and 1V thresholds are provided herein for example only. Optimal thresholds would depend on the apparatus 10 and the capabilities of the electronic circuits 24. The thresholds also need not be the same for controller 22 and subsystem 20.

In the preferred apparatus 10, when no current flows across the powerbus 16, the ground level of the powerbus 16 remains at substantially 0V and the power level of the powerbus 16 remains at substantially 13.5V at substantially all points along the powerbus 16. At this no current state, transmission and detection of bits can be accomplished with traditional use of RS232 transceivers serving as electronic circuits 24.

When current is drawn across the powerbus 16, however, the voltage drops and ground shifts may inhibit detection of bits. Because the controller 22 is located in the vehicle 12 and close to the battery 14, the voltage drop and ground shift at the controller 22 are negligible. But at the subsystem 20, farther from the battery 14 and connected to the powerbus 16 by connectors J1, J2, and J3, the voltage drop and ground shift are dramatic. In this example, the voltage drop at the subsystem 20 is 3.5VDC and the ground shift is positive 3.5VDC.

The high voltage threshold and the low voltage threshold of the subsystem 20 are measured relative to the shifted ground level at the subsystem 20. So in order to exceed the 2V high voltage threshold, voltage generated by the controller 22 must exceed 5.5VDC (2V plus 3.5V) to be detected as a high bit by the subsystem 20. Due to the ground shift, voltages below 1V at the controller 22 are actually detected as negative voltages by the subsystem 20. Therefore in the preferred apparatus 10, the controller 22 does not have to generate a negative voltage to transmit a low bit during a ground shift. However, because the high threshold at the subsystem is increased, it is essential that the preferred controller 22 be able to generate a voltage in excess of its supply voltage. RS232 transceivers, for example, are supplied 5VDC but can generate 8VDC.

Transmitting a detectable low voltage from the subsystem 20 during a ground shift is the most problematic for apparatus 10. If the subsystem 20 were to transmit a low voltage of 0.2VDC during the ground shift, the controller 22 would receive the voltage as 3.7VDC (0.2VDC plus 3.5VDC), well above the 1V low threshold and even greater than the 2V high threshold. To overcome this problem, the electronic circuit 24 of the subsystem 22 must send a negative voltage signal. In the preferred apparatus 10, the subsystem 20 pulls a negative 4.8VDC relative to its local ground level. This negative voltage will be received at the controller 22 as a negative 1.3VDC, less than the 1V threshold. Although the low voltage in this example is negative at both the subsystem 20 and the controller 22, the electronic circuit 24 of the subsystem 20 need only be capable of pulling a negative voltage of a magnitude equal to or greater than the magnitude of the ground shift plus the threshold value (if the threshold is negative, the negative value is added to the ground shift and if the threshold is positive, the positive value is subtracted from the ground shift). It is therefore essential that the electronic circuit 24 be capable of accepting negative voltages levels relative to its local ground level without damaging the electronic circuit 24, the controller 22, the subsystem 20, or degrading the integrity of the message. It should also be understood that the positive ground shift aids in transmission of high voltage signals from the subsystem 20 to the controller 22.

Because the preferable powerbus 16 of the Blue Wire utilizes a single wire for sending the message, the electronic circuit 24 such as an RS-232 transceiver chip must be able to send and receive bits over the same wire. This type of communication is referred to as "bidirectional communications" and requires one of the electronic circuits 24 to disable transmission while the other is transmitting the message. When an electronic circuit 24 is not transmitting, it is disabled and the voltage level of the powerbus 16 floats to its ground level. While the powerbus 16 remains at ground level, either electronic circuit 24 in the controller 20 or the subsystem 22 may be enabled to transmit a message by generating the high bit or the low bit depending upon which bit is predetermined to begin the message. When transmission is disabled, the electronic circuits 24 are enable to receive messages.

Figure 3:
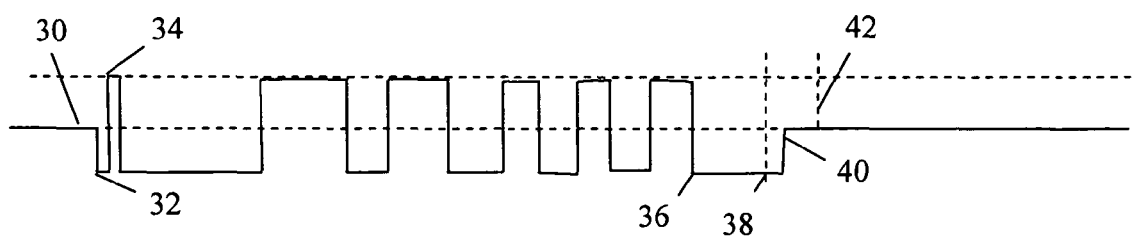
FIG. 3 is a voltage level diagram of voltages across a powerbus over time according to the preferred method of the present invention.

As noted above, the pseudo RS232 transceivers serving as electronic circuits 24 attempt to generate a sufficient positive voltage or pull a sufficient negative voltage level for detection of the high bit or the low bit, respectively. FIG. 3 illustrates the voltage levels relative to ground across the powerbus 16 over the period of time necessary for apparatus 10 to transmit a message. When transmission is disabled at ground level 30, the electronic circuits 24 may either begin transmission of a new message or receive a message. Transmission is enabled by applying a low voltage signal 32 followed by a rising edge voltage detectable as a start bit 34. Each embodiment of the electronic circuits 24 will have its own specific activation times and delay before transmission is enabled. For this reason, an electronic circuit 24 transitioning from the receiving messages to transmitting messages must enable transmission and wait at ground level for another valid low signal 32. Following this activation delay, the electronic circuit 24 may begin transmitting a message, as identified by a start bit 34 shown in FIG. 2 derived from a rising edge of increased voltage. The message itself is a series of high bits and low bits with optional parity bits as described above. A stop bit 36 is shown in FIG. 2 as a low voltage followed by no detectable rising or falling voltages for a minimum of one character time, known as an End of Frame ("EOF") 38. Similar to contemporary serial communication techniques, EOF 38 is determined when a bit is not received within a specified period of time. The electronic circuit 24 will wait for a period of time exceeding one character time before disabling transmission and placing the electronic circuit into receive mode 40. The powerbus will then return to the ground level 42. The electronic circuit 24 receiving the message will not initiate transmission of a responsive message until the electronic circuit 24 sending the message enables reception.

Figure 4A:
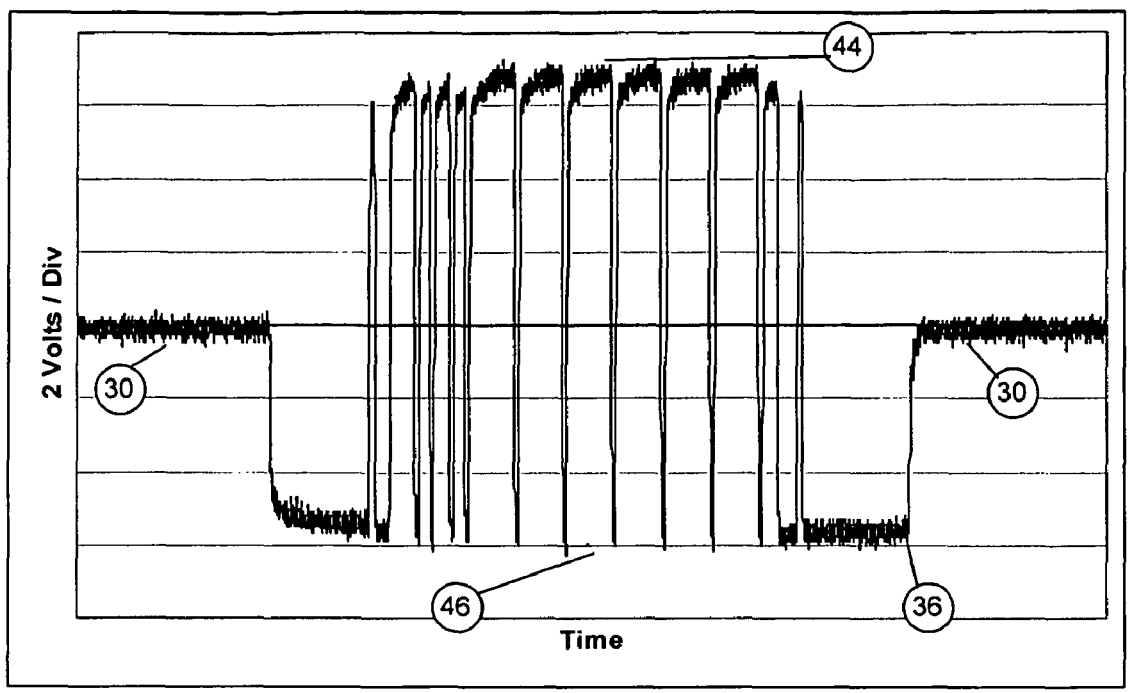
FIG. 4a is a graphical illustration of an oscilloscope displaying voltages across a powerbus over time according to the preferred method of the present invention.
Figure 4B:
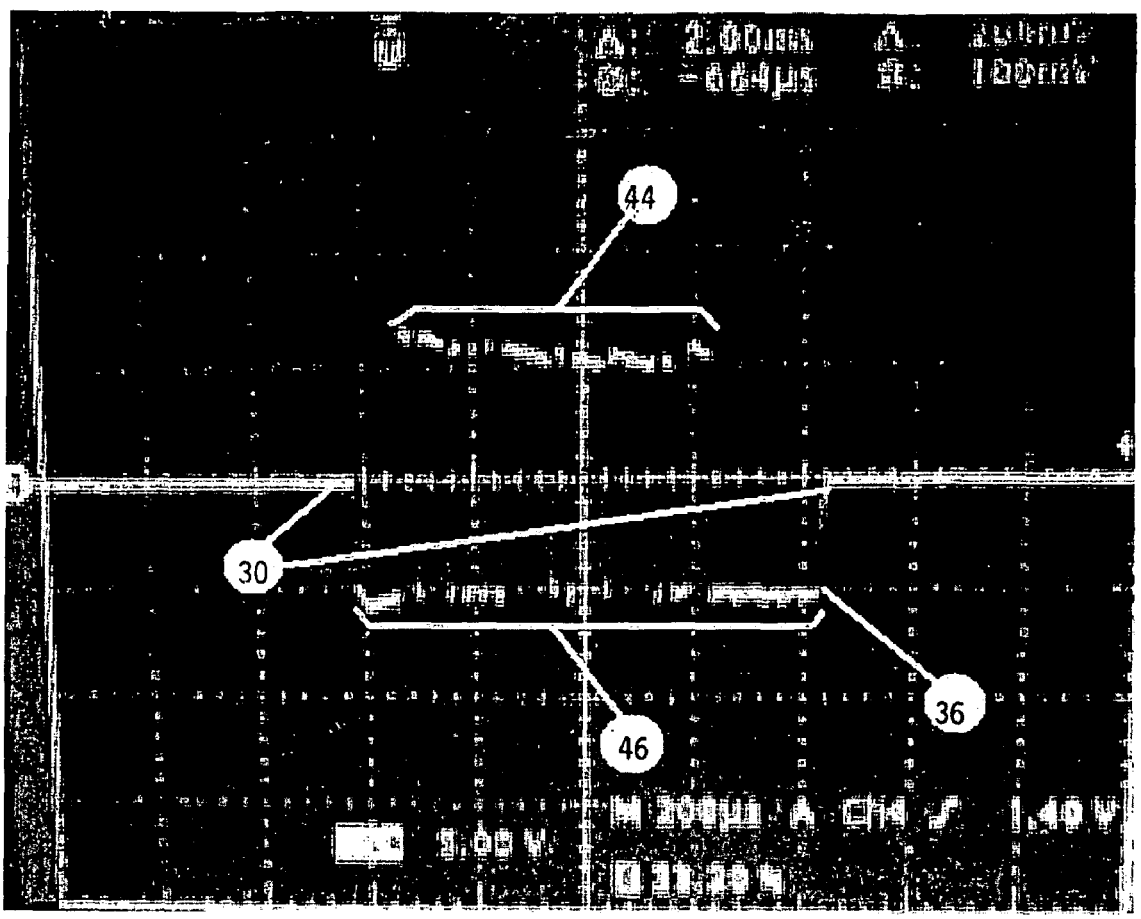
FIG. 4b is a photograph of an oscilloscope displaying voltages across a powerbus over time according to the preferred method of the present invention.
Figure 5A:
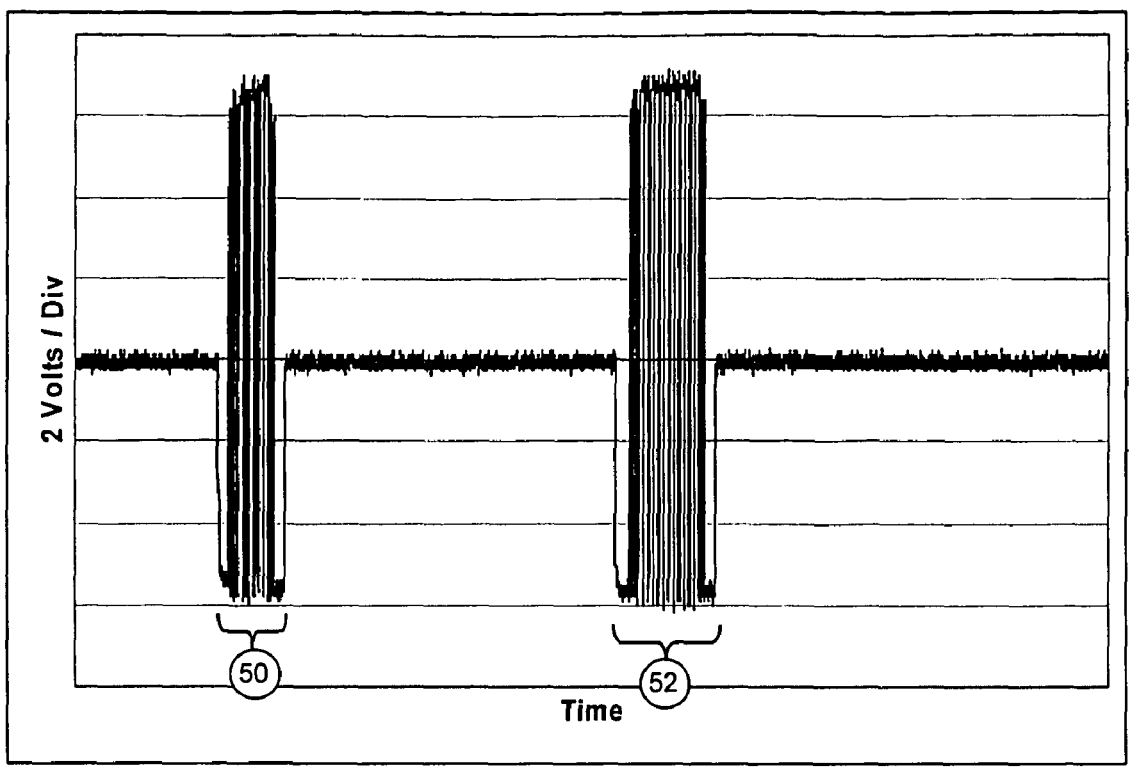
FIG. 5a is a graphical illustration of an oscilloscope displaying voltages across a powerbus over time indicating transmission of a message and a responsive message according to the preferred method of the present invention.
Figure 5B:
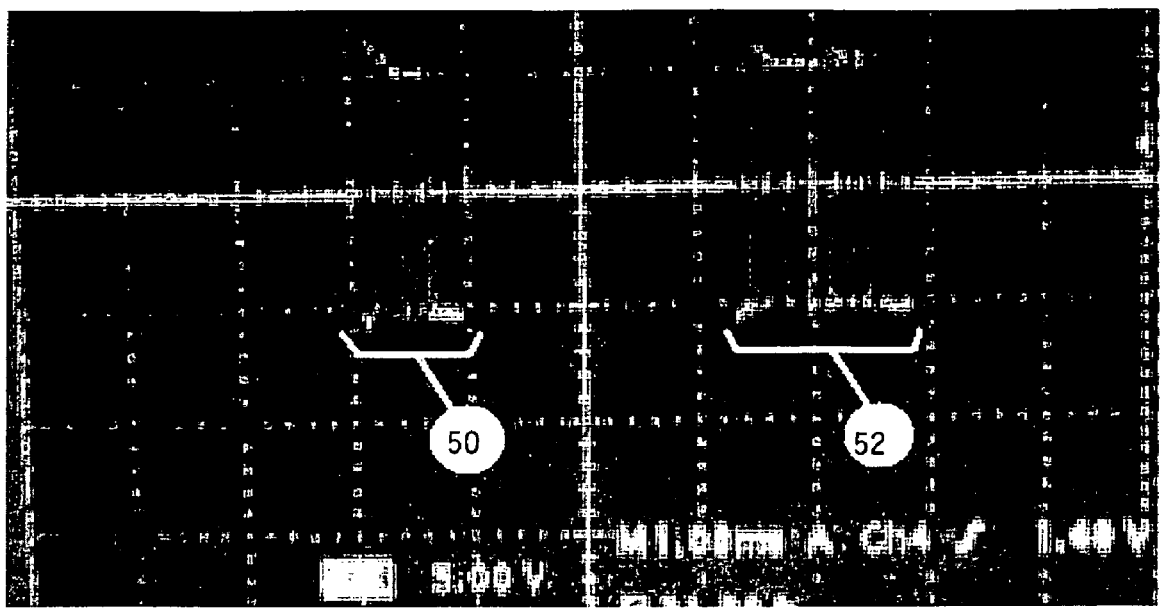
FIG. 5b is a photograph of an oscilloscope displaying voltages across a powerbus over time indicating transmission of a message and a responsive message according to the preferred method of the present invention.

An example of binary communication by the apparatus 10 is also shown in FIG. 4a as a graphical representation of an oscilloscope and in the photograph of an oscilloscope in FIG. 4b on which FIG. 4a is based. Before and after transmission, ground level 30 is maintained. During transmission, positive voltage swings 44 and negative voltage swings 46 are seen over time. FIG. 5a is a graphical representation of an oscilloscope showing a signal trace of a test message 50 sent from the controller 22 and a response message 52 sent from the subsystem 20 in response to the message 50. FIG. 5b is a photograph of the oscilloscope on which FIG. 5a is based. The duration of the messages 50 and 52 is dependent upon the number of bytes within the messages 50 and 52 and the baud rate at which the messages 50 and 52 are sent. The amount of time between the message 50 and the message 52 is dependent upon the baud rate and the capabilities of the powerbus 16, the controller 20, and the subsystem 22. FIG. 4b and FIG. 5b are photographic evidence of the success of apparatus 10 in performing the preferred method of binary communication between the towing vehicle 12 and the subsystems 22.

Before enabling transmission of a message, the preferred method includes the step of determining if binary communication is supported along the powerbus 16. Upon activation, the controller 22 determines if the subsystems 20 support binary communication. At a default baud rate the controller 22 sends a request message to the subsystem 20. The controller 22 then waits a predetermined period of time for the subsystem 20 to respond. If the subsystem 20 responds, binary communication is initiated at the default baud rate. If the subsystem 20 does not respond, the controller 22 will repeat the message at a different baud rate. The preferred default baud rate is the lowest baud rate supported by the controller 22, and the controller 22 will attempt to achieve the highest supported baud rate for communication and failing that, attempt communication for each lower baud rade stored in the controller 22.

If communication is achieved, the controller 22 may also send additional request messages selecting additional baud rates to determine an optimal baud rate. Although not necessary for this additional step, it is preferred that the controller determine the fastest reliable baud rate for communication. A new baud rate would be set after a successful response to each baud rate request message. If either the controller 22 or the subsystem 20 does not receive a message within a preset period of time, the controller 22 and the subsystem 20 will return to the default baud rate and repeat the process of determining the optimal baud rate. The controller 22 will alternatively send subsystem 20 a lock baud rate request and set the baud rate at the default baud rate.

As a fall back if binary communication cannot be established, the controller 22 may be configured to send a traditional pulse width modulated square wave signal to activate trailer braking. The pulse width modulated signal can be received to initiate an electric motor and modulate a pressure control valve within a trailer hydraulic brake actuator. As an additional step of the preferred method, if no baud rate is established, i.e. binary communication has failed, the apparatus 10 defaults to a known method of pulse width modulation. The controller 22 generates voltage along the power bus 16 at a level close to the voltage of the battery 14, or 13.5VDC less an electronic field effect transistor ("FET") (identified as Q1 in FIG. 2) voltage drop of 0-2VDC for a resulting signal level at the controller 22 of no less than 11.5VDC. If low current is flowing across the powerbus 16, this voltage level delivered to the subsystem 20 relative to the ground level is 11.5VDC. When the electronic circuit 24 at the subsystem 20 compares the voltage of the powerbus 16 to the ground reference during a 20 ampere current flow, the voltage level is 11.5VDC less a 3.5VDC drop and the voltage detected is 8VDC. This voltage level of 8VDC is sufficient to activate a subsystem transistor (identified as Q2 in FIG. 2) and be detected by a subsystem CPU (identified as CPU 2 in FIG. 2). To drop voltage, the controller 22 resistor (labeled as R1 in FIG. 2) pulls the voltage down to its ground reference level. The ground reference of the subsystem 20 is 3.5VDC above the battery 14 ground reference and the voltage across the powerbus 16 is a negative 3.5VDC relative to the ground reference of the subsystem 20. This relative negative voltage is more than sufficient to turn "off" transistor Q2 and be detected by the microprocessor CPU2. If the subsystem 20 is a hydraulic trailer brake actuator, the pulse width modulated signal (high and or low) will activate and control the amount of braking to be applied by the actuator. Although not preferable, this fall back signal can at least set the hydraulic brake pressure to a value proportional to the duty cycle of the blue wire signal and thus move hydraulic brake cylinders.

As an additional fall back for trailer braking, the preferred subsystem 20 will activate braking if high voltage signals above the high threshold are received for an extended period of time. In such a circumstance, the high voltages will not be received as a message or messages consisting of high bits, but will instead activate transistor Q2 and the subsystem 20 will interpret the voltages a traditional braking signal and active the brakes "full on". It is because of this fall back that the preferred voltage level for standby communication is ground level.

Although this description has included examples of the controller 22 initiating binary communication, the subsystems 20 may initiate communication and await response from the controller 22. Both the controller 22 and the subsystems 20 have an electronic circuit 24 for transmitting and receiving messages and thus either the controller 22 or the subsystems 20 may be equally effective in initiating binary communication. In the event of a failure of serial communication or failure of the fall back pulse width modulation, it is desirable that the controller 22 provide notification of operational deficiencies to an operator of the vehicle 12.

The present invention is further not limited to trailer braking, despite the use of trailer braking as an example. The towed vehicle 18 may have sophisticated electronics including internal communications networks. The apparatus 10 and the methods described herein are applicable to transmitting any type of data from subsystems 20 to the controller 22 in a vehicle 12. The apparatus 10 and methods therefore give the operator of the vehicle 12 access to any information from the towed vehicle 20.

Thus, the present invention has been described in an illustrative manner. It is to be understood that the terminology that has been used is intended to be in the nature of words of description rather than of limitation.

Many modifications and variations of the present invention are possible in light of the above teachings. For example, the apparatus 10 is not limited to the preferred embodiment and could be constructed of custom built electronics or alternative components. The binary messages are also not limited in the arrangement of bits or the method of programming a message or the response thereto. Therefore, within the scope of the appended claims, the present invention may be practiced otherwise than as specifically described.

The invention claimed is:

1. A method for communicating between at least one subsystem of a towed vehicle and a towing vehicle having a battery and a power bus for distributing electrical power from said vehicle to said at least one subsystem, wherein a ground level voltage across said power bus is not constant and depends upon amperes flowing from said vehicle to said at least one subsystem, said method comprising the steps of:

a. producing a positive voltage greater than a high voltage threshold relative to said ground level voltage over an interval of time to define a high bit;
b. producing a negative voltage lower than a low voltage threshold relative to said ground level voltage over an interval of time to define a low bit;
c. transmitting between said towing vehicle and said towed vehicle subsystem a message comprising a plurality of said high bits and a plurality of said low bits; and
d. receiving said message.

2. The method of claim 1 wherein said power bus comprises two wires and one of said two wires is a ground wire.

3. The method of claim 2 wherein said power bus is a blue wire interface.

4. The method of claim 2 wherein said negative voltage and said positive voltage are produced by a transmitter electrically connected to said power bus.

5. The method of claim 4 wherein said towing vehicle and said towed vehicle each include said transmitter and a receiver.

6. The method of claim 5 wherein only one of said transmitters transmits said message and the other of said transmitters is disabled.

7. The method of claim 5 wherein said transmitter and said receiver are incorporated into a transceiver.

8. The method of claim 5 wherein said message includes a start bit consisting of said low bit, a stop bit consisting of said high bit, and a plurality of data bits, said data bits consisting of said high bit and said low bit.

9. The method of claim 8 wherein said message further includes a parity bit consisting of a low bit or a high bit.

10. The method of claim 9 wherein said message comprises eight data bits.

11. A method for transmitting binary messages between at least one subsystem of a towed vehicle and a towing vehicle having a battery and a power bus for distributing electrical power from said vehicle to said at least one subsystem, wherein a ground level voltage across said power at any given time depends upon amperes flowing from said towing vehicle to said towed vehicle and said controller and said at least one subsystem each have a high voltage threshold and a low voltage threshold relative to the ground level voltage for detecting communication signals, said method comprising the steps of:
a. maintaining the ground voltage along said power bus over a predetermined period of time to enable communication;
b. shifting voltage to a detectable level over a predetermined period of time to begin communication;
c. transmitting a binary message comprising a plurality of detectable high voltages and low voltages each maintained for a predetermined period of character time, said high voltages exceeding said high voltage threshold and said low voltages less than said low voltage threshold and negative relative to ground; and
d. returning to ground level voltage to disable communication.

12. The method of claim 11 wherein voltage is shifted above said high voltage threshold to begin communication.

13. The method of claim 11 wherein voltage is shifted below said low voltage threshold to begin communication.

14. The method of claim 11 wherein said method includes the step of determining if said subsystem supports communication via said method.

15. The method of claim 14 wherein said method includes determining a baud rate for communication and further includes the steps of transmitting a message at a predetermined maximum baud rate and decreasing said baud rate as low as a minimum baud rate until a response is received.

16. The method of claim 14 wherein said method includes determining a baud rate for communication and further includes the steps of transmitting a message at a predetermined maximum baud rate and increasing said baud rate until a response is received.

17. The method of claim 11 wherein said power bus comprises two wires and one of said two wires is a ground wire.

18. The method of claim 17 wherein said power bus is a blue wire interface.

19. The method of claim 17 wherein said negative voltage and said positive voltage are produced by a transmitter electrically connected to said power bus.

20. The method of claim 19 wherein said towing vehicle and said towed vehicle each include said transmitter and a receiver.

21. The method of claim 20 wherein only one of said transmitters transmits said message and the other of said transmitters is disabled.

22. The method of claim 20 wherein said transmitter and said receiver are incorporated into a transceiver.

23. The method of claim 11 wherein said message further includes a parity bit consisting of a detectable high voltages or low voltages.

24. The method of claim 23 wherein said binary message comprises a combination of eight detectable high voltages and low voltages.

25. An apparatus for communicating between a towed vehicle and towing vehicle having a battery and a power bus providing power to said towed vehicle and having a ground level voltage depending upon amperages drawn by said towing vehicle, said apparatus comprising:
a. a controller located in said towing vehicle and electrically connected to said power bus;
b. at least one subsystem located in said towed vehicle and electrically connected to said power bus;
c. an electronic circuit electrically connected to each of said controller and said at least one subsystem; and
d. said electronic circuit adapted for sending and receiving binary messages by creating and detecting positive and negative voltage swings over said power bus for an interval of time irrespective of said ground level voltage at any given time.

26. The apparatus of claim 25 wherein each said electronic circuit is identical.

27. The apparatus of claim 25 wherein said electronic circuit is transceiver.

28. The apparatus of claim 27 wherein said transceiver is an RS232 transceiver adapted to pull voltage negative of said ground level.

29. The apparatus of claim 25 wherein said power bus comprises two wires and of said two wires is a ground wire.

30. The apparatus of claim 29 wherein said power bus is a blue wire interface.

31. The apparatus of claim 25 wherein said at least one towed vehicle subsystem includes a trailer brake actuator and said controller is a trailer brake controller.

32. The apparatus of claim 31 wherein said trailer brake controller is capable of communicating with said trailer brake actuator by pulse width modulation.

* * * * *